United States Patent
Masuda et al.

(10) Patent No.: US 9,563,001 B2
(45) Date of Patent: Feb. 7, 2017

(54) LIGHT SOURCE APPARATUS

(71) Applicant: MITUTOYO CORPORATION, Kanagawa (JP)

(72) Inventors: Norihiko Masuda, Kawasaki (JP); Masashi Ishige, Kawasaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 14/278,461

(22) Filed: May 15, 2014

(65) Prior Publication Data
US 2014/0347879 A1    Nov. 27, 2014

(30) Foreign Application Priority Data

May 21, 2013    (JP) ................................ 2013-106978

(51) Int. Cl.
*F21V 8/00* (2006.01)
*G02B 6/42* (2006.01)

(52) U.S. Cl.
CPC .......... *G02B 6/0006* (2013.01); *G02B 6/4226* (2013.01); *G02B 6/4298* (2013.01)

(58) Field of Classification Search
CPC ...... G02B 6/006; G02B 6/4226; G02B 6/4298
USPC ......................................... 362/581
See application file for complete search history.

(56) References Cited

U.S. PATENT DOCUMENTS

| 4,548,466 A | 10/1985 | Evans et al. |
| 5,029,791 A * | 7/1991 | Ceccon ............... G02B 6/4226 248/287.1 |
| 5,208,888 A * | 5/1993 | Steinblatt ............ G02B 6/4226 385/90 |
| 6,217,231 B1 | 4/2001 | Mesaki et al. |
| 2002/0181891 A1* | 12/2002 | Alcock .................... G02B 6/32 385/79 |
| 2003/0147254 A1* | 8/2003 | Yoneda et al. ............... 362/551 |

FOREIGN PATENT DOCUMENTS

| DE | 3112423 A1 * | 10/1982 | .......... G02B 6/3841 |
| JP | 52-102746 | 8/1977 | |
| JP | 59-135415 | 8/1984 | |
| JP | 10-300987 | 11/1998 | |
| JP | 2005-345984 | 12/2005 | |

OTHER PUBLICATIONS

English machine translation of DE3112423, Oct. 14, 1982, Licentia.*

* cited by examiner

*Primary Examiner* — Sharon Payne
(74) *Attorney, Agent, or Firm* — Greenblum & Bernstein, P.L.C.

(57) ABSTRACT

A light source apparatus includes a light source, an optical fiber, and a positioning mechanism. The positioning mechanism is configured with a planar position adjustment mechanism, an axial line position adjustment mechanism, and an orientation maintaining mechanism. The planar position adjustment mechanism adjusts a position of the optical fiber in a direction following the light-emitting surface. The axial line position adjustment mechanism adjusts the position of the optical fiber in a direction intersecting with the light-emitting surface. The orientation maintaining mechanism holds the optical fiber in a state where an axis direction of the optical fiber lies in a predetermined intersecting direction with respect to the light-emitting surface.

3 Claims, 5 Drawing Sheets

LIGHT SOURCE APPARATUS

CROSS-REFERENCE TO RELATED APPLICATIONS

The present application claims priority under 35 U.S.C. §119 of Japanese Application No. 2013-106978, filed on May 21, 2013, the disclosure of which is expressly incorporated by reference herein in its entirety.

BACKGROUND OF THE INVENTION

1. Field of the Invention

The present invention relates to a light source apparatus channeling light from a light source into an optical fiber.

2. Description of Related Art

In recent years, an LED light source apparatus has been used which takes an LED (light-emitting diode) as a light source and channels light from the LED into an optical fiber. In the LED light source apparatus currently in widespread use, light emitted from a light-emitting surface of the LED is collected by a lens and received on a light-receiving surface of the optical fiber. In order to improve optical connection efficiency, the light-emitting surface of the LED and the light-receiving surface of the optical fiber are positioned facing each other with a slight gap therebetween (see Japanese Patent Laid-open Publication No. H10-300987, paragraphs [0002], [0003], and [0063]).

Japanese Patent Laid-open Publication No. H10-300987 discloses the necessity of mutual positioning accuracy for both the LED and the optical fiber. When meeting this requirement, a light source apparatus can be used that includes an optical fiber fixating structure capable of mutually adjusting the positions in order to fixate the optical fiber with respect to the LED. Examples include an adjustment mechanism that adjusts a distance of the light-receiving surface of the optical fiber with respect to the light-emitting surface of the LED using a mechanism for displacement of the optical fiber in an axis direction, and that also matches a center position of the optical fiber with a specific region of the LED using mechanisms for displacement in each axis direction along the light-emitting surface of the LED (Japanese Patent Laid-open Publication Nos. S52-102746 and 2005-345984). A further example, although not a light source apparatus, is of a coupler connecting optical fibers to each other, the coupler including an adjustment mechanism for matching axes of the optical fibers (Japanese Patent Laid-open Publication No. S59-135415).

Japanese Patent Laid-open Publication No. H10-300987 discloses that mutual position adjustment is necessary when fixating the optical fiber with respect to the LED, but does not clearly disclose a concrete mechanism for doing so. Meanwhile, Japanese Patent Laid-open Publication No. S52-102746 discloses a mechanism accurately matching the positions of center axes of the light-receiving surface of the optical fiber and the light-emitting surface of the LED, which are positioned facing each other in close proximity. However, the mechanism of Japanese Patent Laid-open Publication No. S52-102746 uses an elastic body for the adjustment mechanism and cannot be said to be sufficient from a standpoint of ensuring stability and accuracy of an adjusted state. In this regard, Japanese Patent Laid-open Publication No. 2005-345984 has a configuration in which the optical fiber and the LED are adjusted so as to be in a favorable positional relationship, after which the optical fiber and LED are fixated by a fixating member, thus ensuring stability of the adjusted state. However, the mechanism of Japanese Patent Laid-open Publication No. 2005-345984 has play in each component, as an adjustment margin, during adjustment and an adjustment operation to achieve a favorable positional relationship of the optical fiber and the LED is not necessarily easy. Moreover, fixation can be performed after adjustment in Japanese Patent Laid-open Publication No. S59-135415 as well, but, similar to Japanese Patent Laid-open Publication No. 2005-345984, the adjustment operation is not easy.

As in the above-noted Japanese Patent Laid-open Publication Nos. 2005-345984 and S59-135415, even when stability of the adjusted state is obtained by performing fixation after the adjustment operation, when there is play in the components during adjustment, highly accurate position adjustment becomes difficult. In particular, in the mechanisms of Japanese Patent Laid-open Publication Nos. S52-102746, 2005-345984, and S59-135415, the axis center position of the optical fiber can be matched for each axis direction along the light-receiving surface of the LED, but inclination or the like of the axis center of the optical fiber is difficult to adjust. For example, in the mechanism of Japanese Patent Laid-open Publication No. S59-135415, the inclination of the axis center direction of the optical fiber can be regulated by adjusting fixating screws in two locations mutually offset in the axis center direction of the optical fiber, but because there is nothing determining the position of the optical fiber during adjustment, highly accurate positioning adjustment is difficult.

SUMMARY OF THE INVENTION

The present invention provides a light source apparatus in which a light-receiving surface of an optical fiber can be positioned with respect to a light-emitting surface of a light source with a high degree of accuracy, and an operation of position adjustment can be performed readily.

The present disclosure is directed to a light source apparatus that includes a light source having a light-emitting surface; an optical fiber having a light-receiving surface; and a positioning mechanism positioning the light source and the optical fiber in a state where the light-emitting surface and the light-receiving surface face each other. The positioning mechanism is configured by a planar position adjustment mechanism adjusting a position of the optical fiber in a direction following the light-emitting surface; an axial line position adjustment mechanism adjusting the position of the optical fiber in a direction intersecting with the light-emitting surface; and an orientation maintaining mechanism holding the optical fiber in a state where an axis direction of the optical fiber lies in a predetermined intersecting direction with respect to the light-emitting surface.

Herein, in addition to an LED, a light-emitting element based on other light-emitting principles, such as a filament lamp, may be used as the light source. In the present disclosure, the position of the optical fiber can be adjusted in a state where the optical fiber is held by the orientation maintaining mechanism in a predetermined intersection direction. Therefore, the light-receiving surface of the optical fiber can be positioned with respect to the light-emitting surface of the light source with a high degree of accuracy, and the operation of position adjustment can be performed readily.

In the light source apparatus according to the present disclosure, the orientation maintaining mechanism is preferably supported by the axial line position adjustment mechanism, and the axial line position adjustment mechanism is preferably supported by the planar position adjustment mechanism. Thus, the present disclosure can be mechanically simplified and optimally configured due to reciprocal functions of each of the orientation maintaining mechanism, the axial line position adjustment mechanism, and the planar position adjustment mechanism.

In the light source apparatus according to the present disclosure, the axial line position adjustment mechanism is preferably configured with a tubular holder holding the optical fiber; a sleeve holding the holder so as to be displaceable in the axis direction of the optical fiber; and a fixating mechanism equipped on the sleeve and tightening against and fixating the holder in a diameter direction thereof. The orientation maintaining mechanism is preferably configured with a slip ring positioned in at least two locations along the axis direction of the optical fiber between an outer circumferential surface of the holder and an inner circumferential surface of the sleeve. Thus, the present disclosure can use a so-called ferrule as the holder. The holder and the sleeve preferably have, but are not limited to, a circular cross-section, and may instead have a polygonal cross-section. In the present disclosure, the holder is held with the slip rings. Therefore, even when the holder is not fixated by the fixating mechanism, inclination with respect to the axis direction during position adjustment can be prevented and highly accurate positioning can be performed. In addition, in the present disclosure, by interposing the slip rings between the holder and the sleeve, the entire outer circumferential surface of the holder never contacts the inner circumferential surface of the sleeve, and thus an area of contact can be reduced. Thereby, sliding friction/resistance of the holder with respect to the sleeve can be reduced. Accordingly, an operation to adjust the axis direction position of the optical fiber can be performed readily.

A screw can be used as the fixating mechanism, the screw running through the sleeve and having a forefront end thereof abut a surface of the holder. A plurality of the screws are preferably provided in the circumferential direction and are arrayed in the circumferential direction at intervals of 90° or 120°. In addition, a mechanism such as a collet chuck (a tool) or a mechanism tightening around the holder with a belt can be used as the fixating mechanism.

The slip ring can be configured with either a continuous series of ribs around an entire circumference or with intermittent ribs, and can even be configured with protrusions arrayed in the circumferential direction. The ribs are not limited to a rectangular cross-section, and may also have a semicircular cross-section. The holder and the slip ring are preferably integral, but are not limited to this and may instead be separate members.

In the light source apparatus according to the present disclosure, the fixating mechanism is preferably equipped between the two slip rings. Thus, even when tightening against the holder using the fixating mechanism, the present disclosure can maintain an orientation of the holder with the slip rings provided on two sides thereof and therefore inclination of the holder caused by a tightening force can be prevented.

According to the present disclosure, a light source apparatus can be provided in which a light-receiving surface of an optical fiber can be positioned with respect to a light-emitting surface of a light source with a high degree of accuracy, and an operation of position adjustment can be performed readily.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, an embodiment of the present invention is described with reference to the drawings.

First Embodiment

Figure 1:
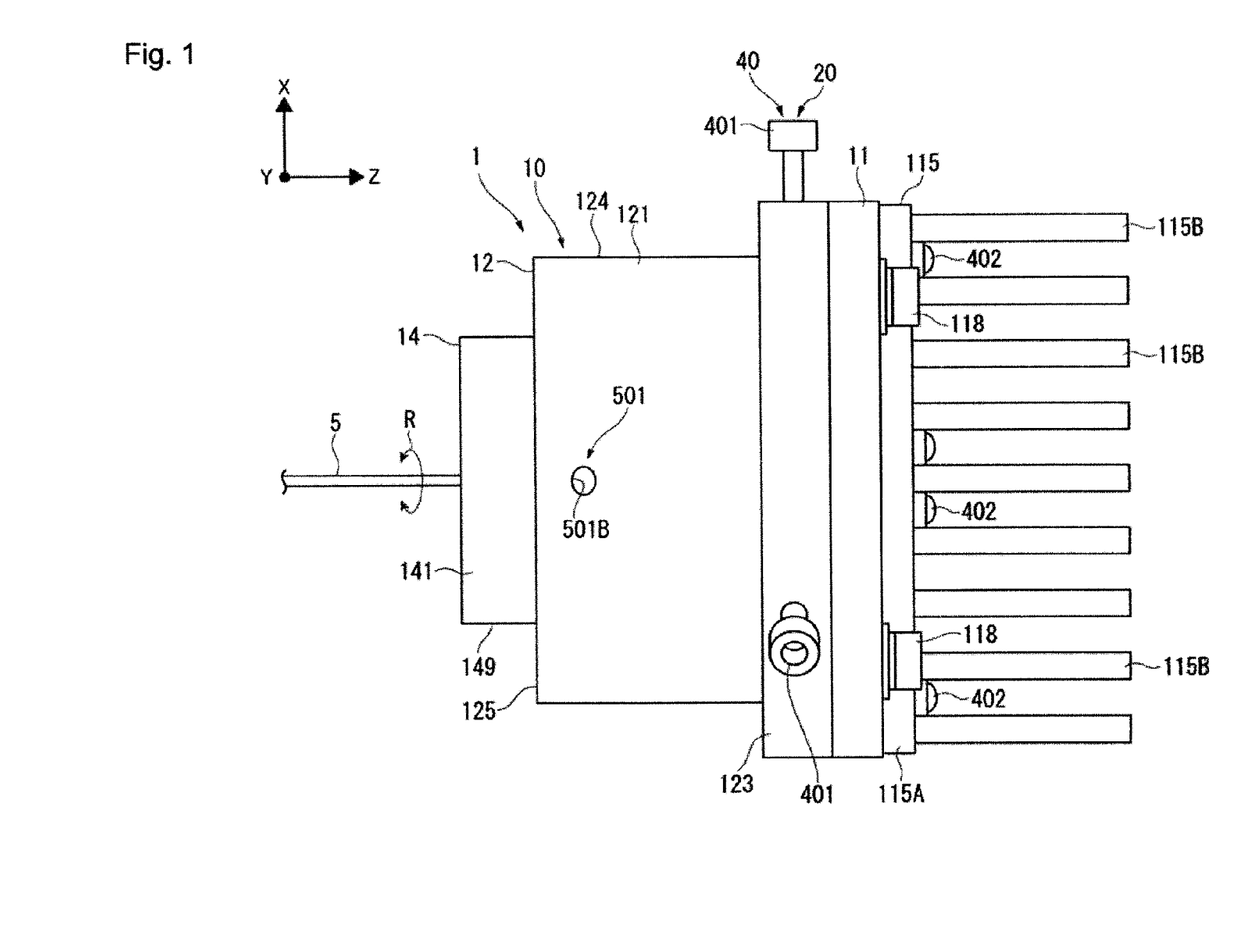
FIG. 1 is a front view illustrating a light source apparatus according to a first embodiment of the present disclosure.
Figure 2:
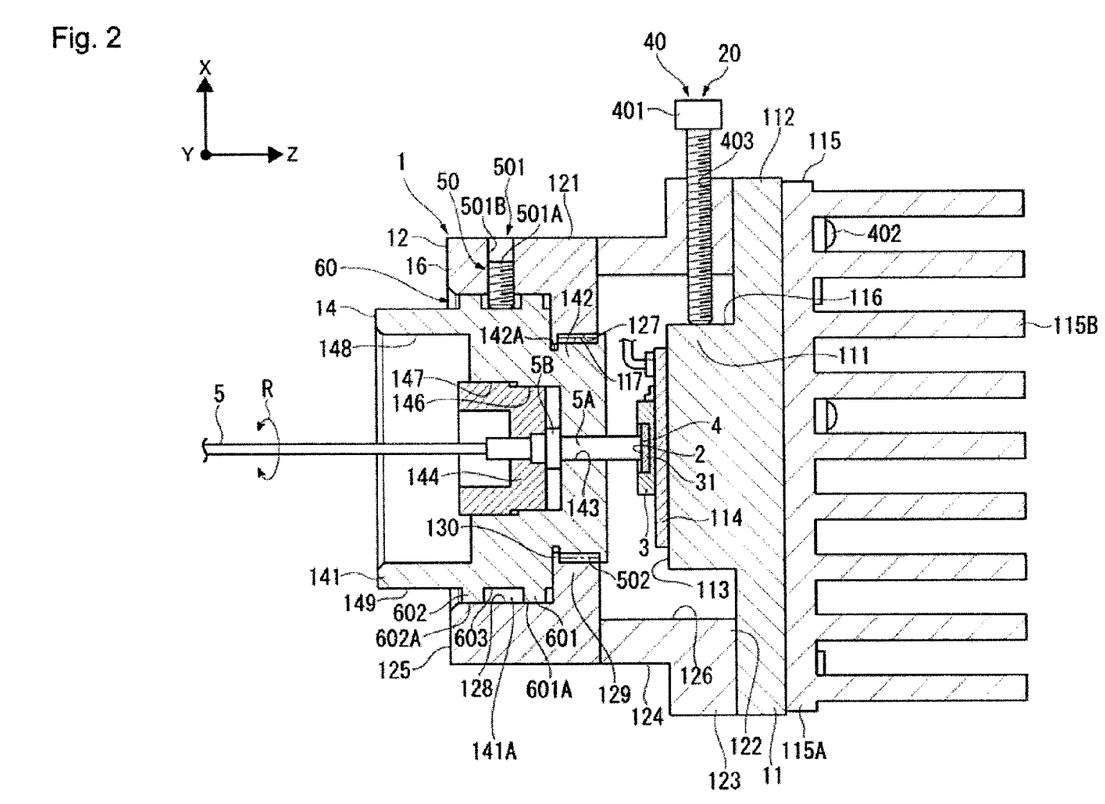
FIG. 2 is a cross-sectional view illustrating the light source apparatus according to the first embodiment.

In FIGS. 1 and 2, a light source apparatus 1 according to a first embodiment of the present disclosure includes a light source 3, which includes a light-emitting surface 2; an optical fiber 5, which includes a light-receiving surface 4; a positioning mechanism 20 positioning the light source 3 and the optical fiber 5 in a state where the light-emitting surface 2 and the light-receiving surface 4 face each other; and a casing 10 holding the above components. In the light source apparatus 1, light emitted from the light-emitting surface 2 of the light source 3 is received on the light-receiving surface 4 of the optical fiber 5.

The casing 10 includes a base 11 holding the light source 3 on a surface thereof, a case 12 joined to the base 11 and covering the light source 3, and a holder 14 holding an end of the optical fiber 5. A sleeve 16 is formed on the case 12 to mount the holder 14.

The light source 3 is configured by an LED chip having an LED 31 performing surface emission. The light-emitting surface 2 of the light source 3 has a rectangular shape whose dimensions are 0.95 to 1.0 mm square. In the present embodiment, the LED 31 is fabricated to be flat so as to enable the light-emitting surface 2 to emit light uniformly from any region. However, in reality, substantial variation may occur in a surface shape of the light-emitting surface 2 and a condition of, for example, an amount of light, a spectrum, and a brightness of light emitted from different regions. A rear surface of the light source 3 is held by the base 11 such that the light-emitting surface 2 is positioned opposite the light-receiving surface 4.

The optical fiber 5 extends in a Z axis direction and is detachably held by the holder 14 such that the light-receiving surface 4 thereof is parallel with a plane orthogonal to the Z axis direction. The light-receiving surface 4 has a circular shape and a diameter of 50 μm. Accordingly, an area of the light-receiving surface 4 is much smaller than the area of the light-emitting surface 2 in the present embodiment. An input end 5A of the optical fiber 5 is held by the holder 14 such that the light-receiving surface 4 is positioned opposite the light-emitting surface 2.

The base 11 includes a disk-shaped main body 111; an annular flange 112 provided to an end of the disk-shaped main body 111 away from the holder; an attachment plate 114 fixated to an end surface 113 of the disk-shaped main body 111 close to the holder; and a heat sink 115. The rear surface of the light source 3 is attached to the attachment plate 114. The heat sink 115 is mounted on end surfaces of the disk-shaped main body 111 and the annular flange 112 away from the holder.

The disk-shaped main body 111 is provided so as to be coaxial with the case 12. The disk-shaped main body 111 is positioned at a distance from the holder 14 in the Z axis direction and at a distance from the case 12 in a diameter direction. The round annular flange 112 is integrally provided to a portion of an outer circumferential surface 116 of the disk-shaped main body 111 away from the holder.

A through-hole (not shown in the drawings) is formed in the annular flange 112, the through-hole extending in the Z axis direction and having a spring mount fixating screw 402 inserted therein, the spring mount fixating screw 402 fixating the base 11 to the case 12. The number and positioning of the through-hole correspond to the number and positioning of the spring mount fixating screw 402. The through-hole has a diameter larger than the diameter of the spring mount fixating screw 402, such that a gap is formed with the spring mount fixating screw 402. By forming this gap, when the spring mount fixating screw 402 is loosened, as described hereafter, the base 11 is displaceable with respect to the case 12 within an X-Y axis plane.

In addition, a fixating screw 118 (shown in FIG. 1) is provided on the annular flange 112, the fixating screw 118 fixating the base 11 independently of the spring mount fixating screw 402. The fixating screw 118 threads together with the base 11 and, by rotating the fixating screw 118, the base 11 is pressed against and fixated to the case 12. This fixated state can be released by reverse rotation of the fixating screw 118.

The case 12 includes a cylindrical main body 121 extending in the Z axis direction and an annular flange 123 provided to an end 122 of the cylindrical main body 121 close to the base. The round annular flange 123 is integrally provided to an outer circumferential surface 124 of the cylindrical main body 121, and threading holes (not shown in the drawings) for a plurality of spring mount fixating screws, extending in the Z axis direction, are formed in the annular flange 123.

A large diameter inner circumferential surface 126, a small diameter inner circumferential surface 127, and an intermediate diameter inner circumferential surface 128 are formed in the cylindrical main body 121, the inner circumferential surfaces 126, 127, and 128 being aligned in order in the Z axis direction from the end 122 toward an end 125 away from the base. The large diameter inner circumferential surface 126 extends further in the Z axis direction than the annular flange 123, the small diameter inner circumferential surface 127, and the intermediate diameter inner circumferential surface 128. The intermediate diameter inner circumferential surface 128 extends further in the Z axis direction than the small diameter inner circumferential surface 127, and a portion thereof on the end 125 side is beveled. A portion forming the small diameter inner circumferential surface 127 of the cylindrical main body 121 configures a small diameter annular stepped portion 129. A small diameter annular projection 130 is further formed on the portion on the end 125 side of the small diameter inner circumferential surface 127.

The sleeve 16 is configured by a region on the end 125 side of the above-described case 12. The holder 14 is retained on an interior of the inner circumferential surface 128, and the retained holder 14 is displaceable in an axis direction of the optical fiber 5, guided by the inner circumferential surface 128.

Threading holes 403 and a threading hole 501B are formed on the cylindrical main body 121, the threading holes 403 threading together with three position adjustment screws 401 for adjusting a position of the base 11 on the X-Y axis direction plane, and the threading hole 501B threading together with a fixating screw 501A fixating the holder 14.

The holder 14 includes a cylindrical main body 141, an annular plate 142 integrally provided to a first Z axis direction end of the cylindrical main body 141, and a holder member 144 directly holding the optical fiber 5 on an interior of the cylindrical main body 141.

A small diameter inner circumferential surface 146, an intermediate diameter inner circumferential surface 147, and a large diameter inner circumferential surface 148 are formed on the cylindrical main body 141, the inner circumferential surfaces 146, 147, and 148 being aligned in order in a direction moving away from the annular plate 142 in the Z axis direction. The large diameter inner circumferential surface 148 extends further in the Z axis direction than the annular plate 142, the small diameter inner circumferential surface 146, and the intermediate diameter inner circumferential surface 147, and a second end away from the annular plate 142 in the Z axis direction is beveled.

The cylindrical main body 141 is provided so as to be coaxial with the case 12, and an outer circumferential surface 149 thereof is away from the inner circumferential surface 128 of the case 12. An annular gap 141A is provided between the outer circumferential surface 149 and the inner circumferential surface 128.

The round annular plate 142 has a smaller diameter than the cylindrical main body 141, and an annular portion 142A having an even smaller diameter is formed on a portion close to the cylindrical main body 141. The input end 5A of the optical fiber 5 is extractably inserted into a through-hole 143.

The holder member 144 includes a small diameter annular portion having a diameter corresponding to that of the small diameter inner circumferential surface 146, and an intermediate diameter annular portion having a diameter corresponding to that of the intermediate diameter inner circumferential surface 147. When, in a state where the optical fiber 5 has been inserted into the holder member 144, the small diameter annular portion of the holder member 144 is fitted onto the small diameter inner circumferential surface 146 of the cylindrical main body 141, a flange 5B provided to and increasing a diameter of the input end 5A of the optical fiber 5 is pinched by the holder member 144 and the annular plate 142.

By fitting together with the intermediate diameter inner circumferential surface 147, the intermediate diameter annular portion of the holder member 144 works together with the annular plate 142 to fixate the holder member 144 to the cylindrical main body 141. Here, in the present embodiment, the holder member 144 is fixated to the cylindrical main body 141 by pressure against the intermediate diameter inner circumferential surface 147. However, the holder member 144 may instead, for example, be fixated by being threaded together or fixated by an adhesive.

Thus, in the holder 14, the optical fiber 5 is inserted into the cylindrical main body 141, the holder member 144, and the through-hole 143; and, by fixating the holder member 144 to the cylindrical main body 141, the flange 5B is pinched between and fixated by the holder member 144 and the annular plate 142. Accordingly, the holder 14 holds the optical fiber 5. The holder 14 holding the optical fiber 5 is held close to the case 12 via an orientation maintaining mechanism 60.

In the light source apparatus 1 of this kind, relative positions of the light-emitting surface 2 of the light source 3 and the light-receiving surface 4 of the optical fiber 5 have a significant influence on a light reception status, and therefore these components must be positioned appropriately and with a high degree of accuracy. In order to do this, the case 12 is equipped with the positioning mechanism (positioner) 20 for highly accurate positioning of the light-receiving surface 4 of the optical fiber 5 with respect to the light-emitting surface 2 of the light source 3. In the present embodiment, the positioning mechanism 20 includes a planar position adjustment mechanism (position adjuster) 40 adjusting an axial line position of the optical fiber 5 with respect to the light-emitting surface 2; an axial line position adjustment mechanism (axial line position adjuster) 50 adjusting an axis-direction distance of the optical fiber 5 with respect to the light-emitting surface 2; and the orientation maintaining mechanism (orientation maintainer) 60 maintaining a constant axis-direction inclination of the optical fiber 5 with respect to the light-emitting surface 2. In the present embodiment, the optical fiber 5 is supported by the orientation maintaining mechanism 60, the orientation maintaining mechanism 60 is supported by the axial line position adjustment mechanism 50, the axial line position adjustment mechanism 50 is supported by the planar position adjustment mechanism 40, and the planar position adjustment mechanism 40 is supported by the base 11, onto which the light source 3 is fixated. This hierarchical structure configures the positioning mechanism 20.

In order to be capable of adjusting a position of the optical fiber 5 in a direction along the light-emitting surface 2 (X-Y axis direction), the planar position adjustment mechanism 40 is configured by the base 11, the case 12, the threading hole 403, the position adjustment screw 401, and the spring mount fixating screw 402.

The threading hole 403 is positioned on the end 122, runs through the annular flange 123 and cylindrical main body 121, and opens on the large diameter inner circumferential surface 126. The number and positioning of the threading hole 403 correspond to those of the position adjustment screw 401. Accordingly, three of the threading holes 403 are provided so as to be mutually equidistant in a circumferential direction around an axis center of the case 12 and the holder 14.

Figure 3:
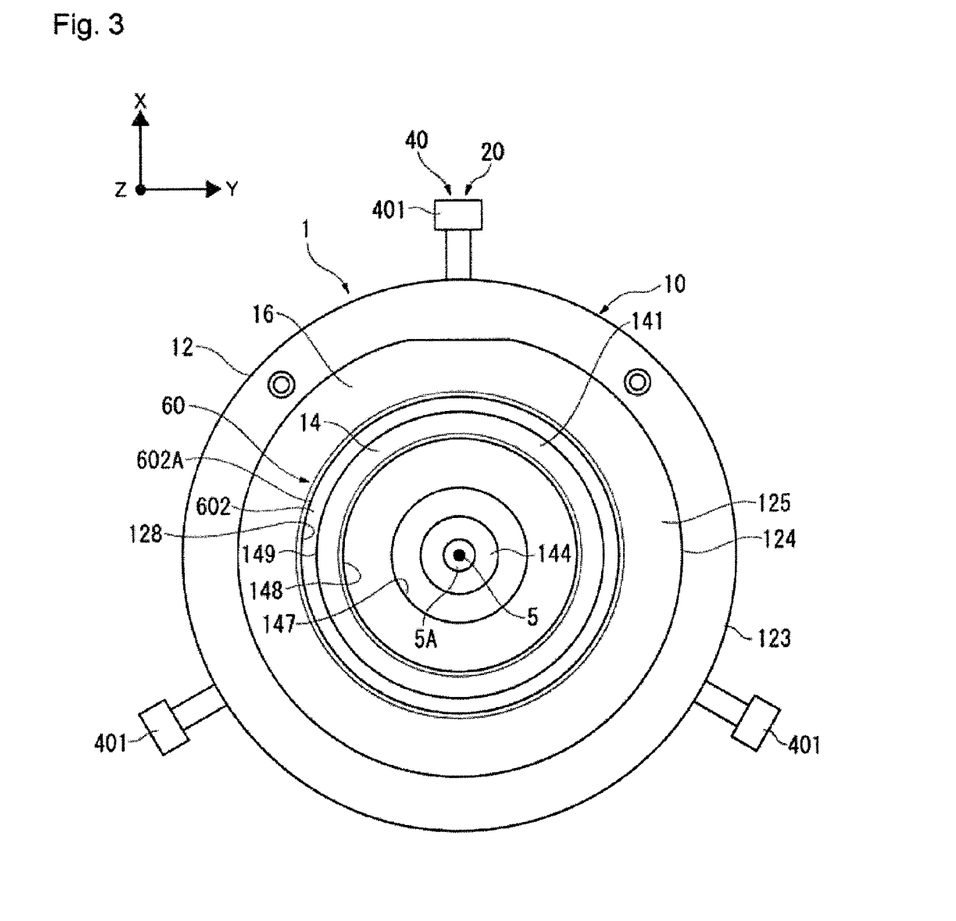
FIG. 3 is a side view illustrating the light source apparatus according to the first embodiment.

By rotating each of the three position adjustment screws 401, the base 11 is displaced within the X-Y axis direction plane. The three position adjustment screws 401 are provided so as to be mutually equidistant in the circumferential direction around the axis center of the base 11, the case 12, and the holder 14, as shown in FIG. 3. The spacing is equiangular, 120° in the present embodiment. Further, each of the position adjustment screws 401 is threaded together with the respective threading holes 403, and forefront ends of the position adjustment screws 401 contact the outer circumferential surface 116 of the disk-shaped main body 111.

Each of the position adjustment screws 401 is rotated to advance and retreat in a diameter direction, and to adjust a position of the light source 3 (held by the base 11) relative to the case 12 in the X-Y axis direction plane. An amount of advance and retreat of each position adjustment screw 401 is, in the present embodiment, proportionate to a radius of the light-receiving surface 4 (25 µm in the present embodiment) for one rotation, but the amount may also be smaller. Each of the position adjustment screws 401 is configured so as to be rotated by a manual operation, but the position adjustment screws 401 may also be configured so as to be rotated by drive from a drive apparatus, for example.

A plurality of the spring mount fixating screws 402 are provided along the circumferential direction and extend in the Z axis direction. The spring mount fixating screws 402 are placed in the through-holes of the base 11 and threaded together with the annular flange 123 of the case 12. Rotating the plurality of spring mount fixating screws 402 fixates the base 11 to the case 12 by pressing the annular flange 112 against the annular flange 123.

In addition, by reverse rotation of the plurality of spring mount fixating screws 402, the pressure of the annular flange 112 against the annular flange 123 is slackened and the base 11 is rendered displaceable in the X-Y axis direction with respect to the case 12. Here, even in a state where the pressure is slackened, the position of the base 11 is maintained to a certain degree due to a spring force of the spring mount fixating screws 402, and thus there is no risk of unintentional displacement of the base 11 with respect to the case 12. Moreover, the heat sink 115 is located between the base 11 and heads of the spring mount fixating screws 402, and therefore the heat sink 115 can also be pressed toward the case 12.

The axial line position adjustment mechanism 50 adjusts the position of the optical fiber 5 in the Z axis direction, which is orthogonal to the light-emitting surface 2. The axial line position adjustment mechanism 50 is configured with the holder 14; a fixating mechanism 501 tightening against and fixating the holder 14; and a threaded portion 502 formed on each of the small diameter inner circumferential surface 127 of the case 12 and the outer circumferential surface 117 of the annular plate 142 of the holder 14, and threading each of the components together.

The fixating mechanism 501 is positioned between a slip ring 601 and a slip ring 602, described below, is equipped on the sleeve 16, and is configured so as to tighten against and fixate the holder 14 in the diameter direction thereof.

The fixating mechanism 501 is configured with the above-described fixating screw 501A and threading hole 501B. The threading hole 501B extends in the diameter direction toward the axis center of the cylindrical main body 121, runs through the cylindrical main body 121 from the outer circumferential surface 124, and opens on the intermediate diameter inner circumferential surface 128. The number and positioning of the threading hole 501B correspond to those of the fixating screw 501A.

A plurality of the fixating screws 501A extend in the diameter direction and are arrayed at intervals of 90° or 120° in the circumferential direction of the sleeve 16. The fixating screws 501A fixate the holder 14 in a state where the fixating screws 501A run through the sleeve 16 and forefront ends thereof abut the outer circumferential surface 149 of the holder 14. When the fixating screws 501A are rotated out of this state and separate from the holder 14 in the diameter direction, fixation by the fixating mechanism 501 is released.

The threaded portion 502 is configured by a female threading formed on the small diameter inner circumferential surface 127 of the case 12 and a male threading formed on the outer circumferential surface 117 of the holder 14. Rotation of the threaded portion 502 in an R direction displaces the holder 14 in the Z axis direction with respect to the case 12. This displacement adjusts the position of the holder 14 in the axis direction.

The orientation maintaining mechanism 60 holds the optical fiber 5 in a state where the axis direction of the optical fiber 5 lies in the Z axis direction with respect to the light-emitting surface 2. The orientation maintaining mechanism 60 is configured by the slip rings 601 and 602, which are positioned in at least two locations on the outer circumferential surface 149 of the holder 14 in the axis direction of the optical fiber 5 and which abut the inner circumferential surface 128 of the sleeve 16.

The slip rings 601 and 602 provided on the outer circumferential surface 149 of the holder 14 are positioned so as to be separated from each other in the Z axis direction, thus forming an annular trough 603.

The slip ring 601 is integrally provided to a region on the annular plate 142 side of the outer circumferential surface 149 of the cylindrical main body 141. The slip ring 601 includes a sliding outer circumferential surface 601A having a shape complementing the intermediate diameter inner circumferential surface 128 of the case 12. With the sliding outer circumferential surface 601A, the slip ring 601 is in freely sliding contact with the intermediate diameter inner circumferential surface 128.

The slip ring 602 is integrally provided to a region on the outer circumferential surface 149, further away from the annular plate 142 in the Z axis direction than the slip ring 601. The slip ring 602 includes a sliding outer circumferential surface 602A having a shape complementing the intermediate diameter inner circumferential surface 128 of the case 12. With the sliding outer circumferential surface 602A, the slip ring 602 is in freely sliding contact with the intermediate diameter inner circumferential surface 128.

The annular trough 603 is formed by the outer circumferential surface 149 of the cylindrical main body 141, and surfaces of both the slip ring 601 and the slip ring 602 which face each other in the Z axis direction. A forefront end of the threaded-in fixating screw 501A is positioned in the annular trough 603. When the forefront end presses against the outer circumferential surface 149, the holder 14 is fixated and rotation in the R direction is prohibited.

The orientation maintaining mechanism 60 of this kind snugly contacts the intermediate diameter inner circumferential surface 128 of the case 12 in a slidable manner at at least two points separated from each other in the Z axis direction. Even when the holder 14 is not fixated by the fixating screws 501A, due to this contact, the holder 14 is prevented from tilting with respect to the case 12. Meanwhile, the orientation maintaining mechanism 60 also reduces an area of contact between the holder 14 and the sleeve 16, and thus sliding friction/resistance between the holder 14 and the case 12 can be reduced. Accordingly, an operation to adjust the axis-direction position of the optical fiber 5 can be performed readily.

The heat sink 115 includes a heat-releasing plate 115A positioned adjacent to the base 11, and a plurality of heat-releasing fins 115B formed on the heat-releasing plate 115A, the fins 115B extending in the Z axis direction and aligned in the X axis direction. A through-hole (not shown in the drawing) is formed on the heat-releasing plate 115A and the spring mount fixating screw 402 is placed within the through-hole. The heat sink 115 is fixated to the base 11 as well as the case 12 by rotating the spring mount fixating screw 402.

In the light source apparatus 1 of this kind, the position of the optical fiber 5 with respect to the light source 3 is adjusted as described below. First, the fixating screws 501A and spring mount fixating screws 402 are loosened and the holder 14 is rendered rotatable in the R direction while the base 11 is rendered displaceable in the Z axis direction.

Next, the light emitted from the light-emitting surface 2 of the light source 3 is received by the light-receiving surface 4 of the optical fiber 5, the holder 14 and the position adjustment screws 401 are rotated based on a state of received incident light, then the light source 3 is displaced in the Z axis direction and the X-Y axis direction. In this way, the light-emitting surface 2 is positioned with respect to the light-receiving surface 4. Finally, the holder 14 and the base 11 are tightened against and fixated to the case 12 by the fixating screws 501A and the spring mount fixating screws 402.

Here, the orientation of the holder 14 is maintained by the orientation maintaining mechanism 60 even when the fixating screws 501A are loosened, and thus highly accurate positioning can be performed without leading to any tilting in the holder 14 and the optical fiber 5. Moreover, position adjustment using the axial line position adjustment mechanism 50 may be performed at any time before, during, and after position adjustment using the planar position adjustment mechanism 40.

The following advantages can be obtained in the present embodiment. In the present embodiment, adjustment of the position of the optical fiber 5 can be performed in a state where the optical fiber 5 is held by the orientation maintaining mechanism 60. Therefore, even during the position adjustment, the light-receiving surface 4 of the optical fiber 5 can be positioned with respect to the light-emitting surface 2 of the light source 3 with a high degree of accuracy, and the operation of position adjustment can be performed readily. In addition, in the present embodiment, the orientation maintaining mechanism 60 is supported by the axial line position adjustment mechanism 50 and the axial line position adjustment mechanism 50 is supported by the planar position adjustment mechanism 40. Therefore, the present disclosure can be mechanically simplified and optimally configured due to a relationship between reciprocal functions of each mechanism.

In the present embodiment, the orientation maintaining mechanism 60 holds the holder 14 with the slip rings 601 and 602. Therefore, even when the holder 14 is not fixated by the fixating screws 501A, tilting with respect to the case 12 can be prevented and highly accurate positioning can be performed. In addition, in the present embodiment, the slip rings 601 and 602 are located between the holder 14 and the sleeve 16. Accordingly, the entire outer circumferential surface 149 of the holder 14 is never in contact with the inner circumferential surface 128 of the sleeve 16, and thus the contact area can be reduced. Thereby, the sliding friction/resistance of the holder 14 with respect to the sleeve 16 can be reduced. Accordingly, an operation to adjust the axis-direction position of the optical fiber 5 can be performed readily.

In the present embodiment, tightening is performed by the fixating mechanism 501, which is installed between the two slip rings 601 and 602, and thus tilting of the holder 14 due to a tightening force can be prevented.

Second Embodiment

Figure 4:
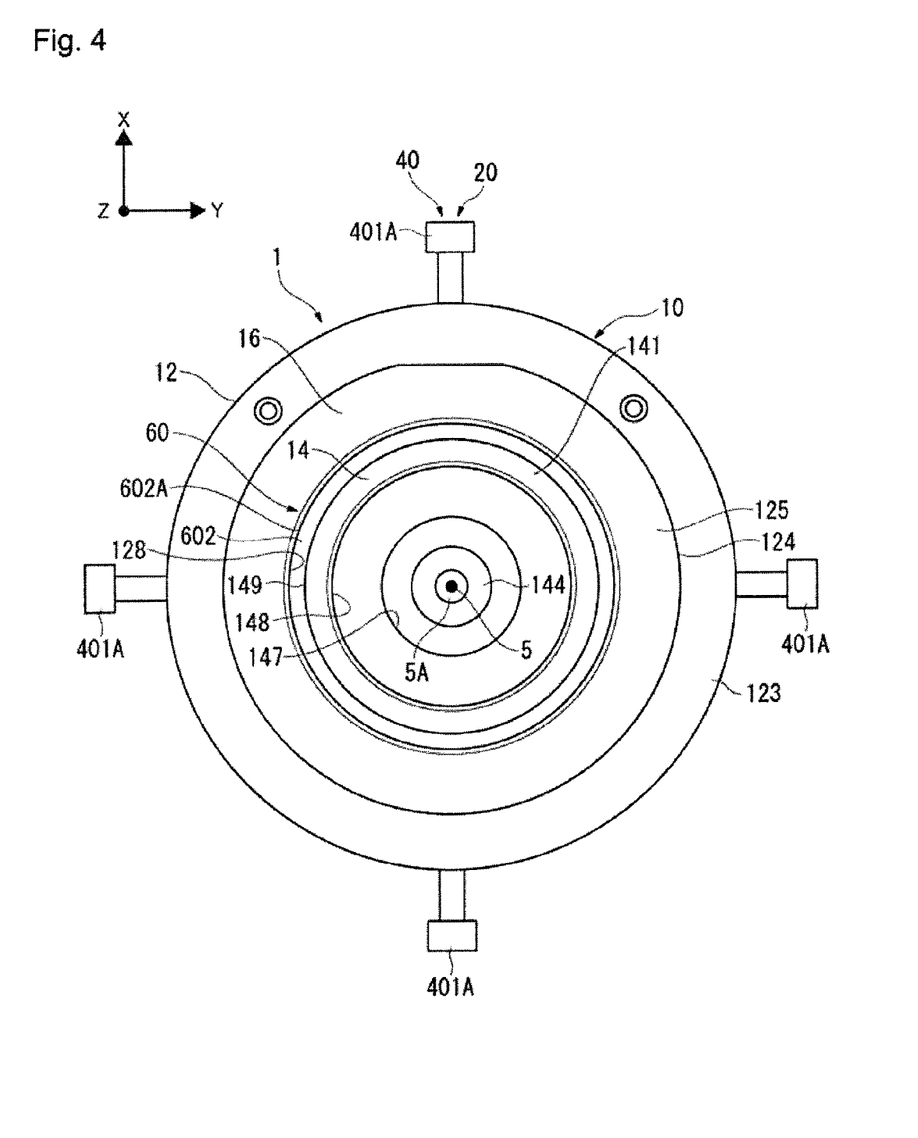
FIG. 4 is a side view illustrating a light source apparatus according to a second embodiment of the present disclosure.

FIG. 4 illustrates a second embodiment according to the present disclosure. In the present embodiment, the basic configuration of the light source apparatus 1 is similar to that described above in the first embodiment. Accordingly, identical reference numerals are used for similar structures, and duplicative descriptions are omitted. In contrast to the use of the three position adjustment screws 401 in the first embodiment, the light source apparatus 1 of the present embodiment uses four position adjustment screws 401A positioned at equal intervals from each other in the circumferential direction, herein, at equiangular intervals (90°), as shown in FIG. 4. In the light source apparatus 1 according to the present embodiment configured in this way, rotation of each of the position adjustment screws 401A can displace the base 11 in the X-Y axis direction. Accordingly, an advantage similar to that described above in the first embodiment can be achieved in the present embodiment as well.

Third Embodiment

Figure 5:
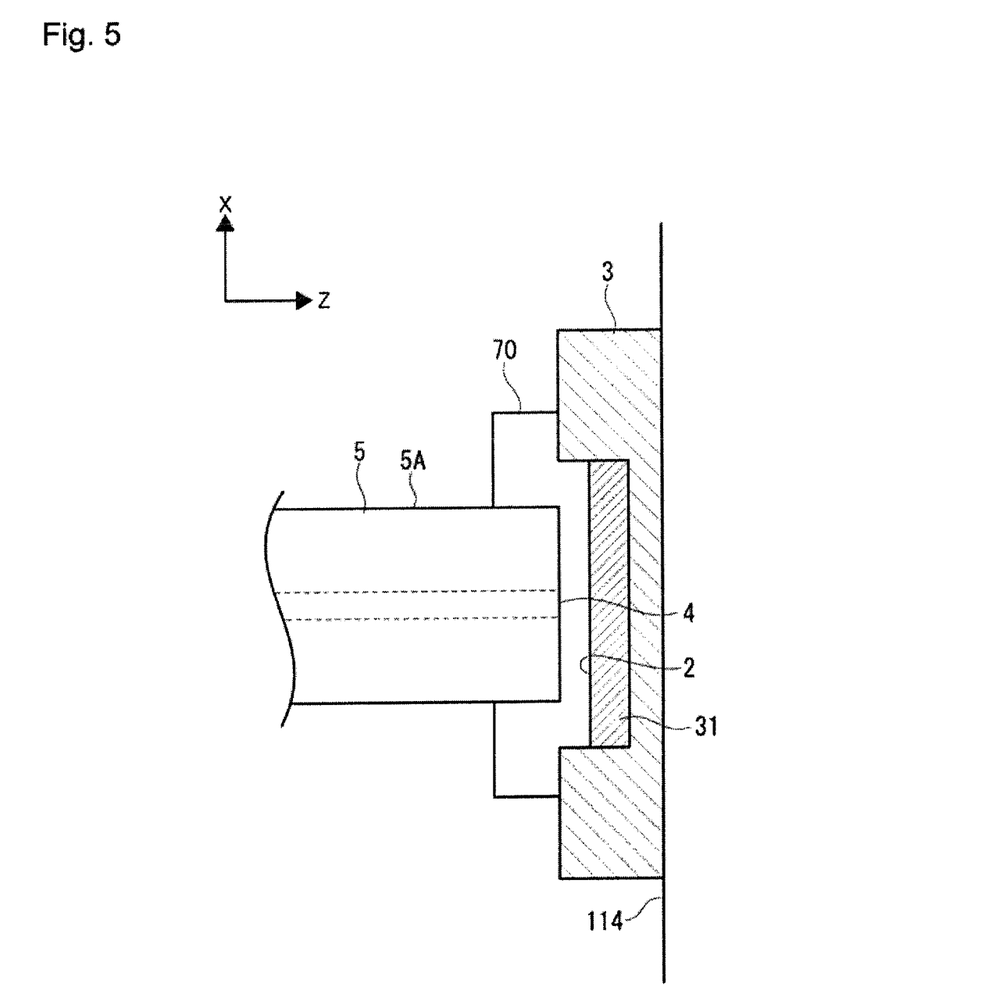
FIG. 5 is an expanded view illustrating a light source and a medium of a light source apparatus according to a third embodiment of the present invention.

FIG. 5 illustrates the third embodiment according to the present disclosure. In the present embodiment, the basic configuration of the light source apparatus 1 is similar to that described above in the first embodiment. Accordingly, identical reference numerals are used for similar structures, and duplicative descriptions are omitted. The light source apparatus 1 according to the present embodiment includes, as shown in FIG. 5, a refractive index matching material 70 as a medium correcting a refractive index, interposed between the light-emitting surface 2 of the light source 3 and the light-receiving surface 4 of the optical fiber 5. Therefore, by correcting the refractive index using the refractive index matching material 70, reflection of light by the light-receiving surface 4 of the optical fiber 5 can be reduced. An advantage similar to that described above in the first embodiment can be achieved with the present embodiment, and reflection of light by the light-receiving surface 4 of the optical fiber 5 can be reduced to increase efficiency.

Modifications

Moreover, the present invention is not limited to the above-described embodiments, and includes modifications not deviating from the scope of the present invention. In the above-described embodiments, the slip rings 601 and 602 are provided to the outer circumferential surface 149 of the holder 14. However, the present invention is not limited to this and the slip rings 601 and 602 may also be provided to the inner circumferential surface 128 of the sleeve 16, for example. In such a case, the slip rings 601 and 602 abut the outer circumferential surface 149 of the holder 14. In addition, the slip rings 601 and 602 may be formed separately from the case 12 and the holder 14. In such a case, the interior and exterior sides of the slip rings 601 and 602 abut the outer circumferential surface 149 of the holder 14 and the inner circumferential surface 128 of the case 12.

In the above-described embodiment, the case 12 was configured by a split half body, described above; however, the case 12 may instead be configured by an integrally formed tube. In this case, the annular projection 130 is omitted. The holder 14 may also be shrink fitted with a tube of this kind.

The present invention can be employed in a light source apparatus in which a light-emitting surface of a light source is positioned with respect to a light-receiving surface of an optical fiber.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A light source apparatus comprising: a light source having a light-emitting surface; an optical fiber having a light-receiving surface; a tube configured to hold the optical fiber; and a positioner configured to position the light source and the optical fiber such that the light-emitting surface and the light-receiving surface face each other, the positioner comprising: a planar position adjuster configured to adjust a position of the optical fiber in a direction along the light-emitting surface;

an axial line position adjustment sleeve holding the tube and configured to adjust the position of the optical fiber in a direction intersecting with the light-emitting surface, and comprising a screw located on the sleeve and configured to tighten against the tube in a diameter direction of the tube to fix the tube in the direction intersecting with the light-emitting surface; and a pair of slip rings defining a channel therebetween such that the screw can slide within the channel, the pair of slip rings positioned along the axis direction of the optical fiber between an outer circumferential surface of the tube and an inner circumferential surface of the axial line position adjustment sleeve, the pair of slip rings configured to hold the optical fiber such that an axis direction of the optical fiber is fixed in a predetermined intersecting direction with respect to the light-emitting surface.

2. The light source apparatus according to claim 1, wherein the pair of slip rings is supported by the axial line position adjuster, and the axial line position adjuster is supported by the planar position adjuster.

3. The light source apparatus according claim 1, wherein the screw is further configured to fix the tube against rotation.

* * * * *